G. E. CURRENT.
ROTARY ENGINE.
APPLICATION FILED NOV. 1, 1918.
1,343,115.
Patented June 8, 1920.
2 SHEETS—SHEET 1.
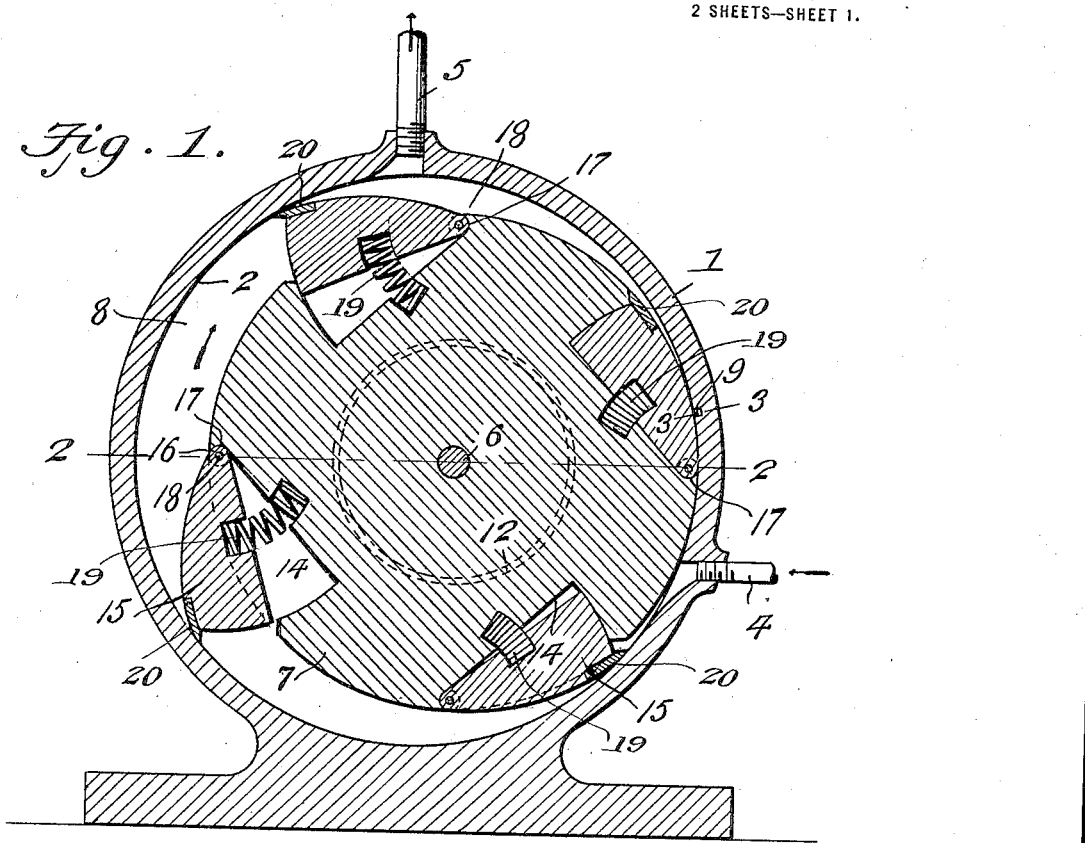
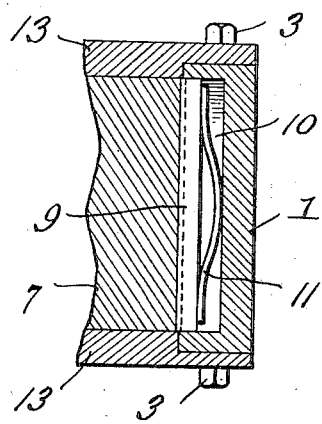
Inventor
G. E. Current.
By Victor J. Evans
Attorney

G. E. CURRENT.
ROTARY ENGINE.
APPLICATION FILED NOV. 1, 1918.

1,343,115.

Patented June 8, 1920.
2 SHEETS—SHEET 2.

Inventor
G. E. Current
By Victor J. Evans
Attorney

UNITED STATES PATENT OFFICE.

GEORGE E. CURRENT, OF MOGOLLON, NEW MEXICO.

ROTARY ENGINE.

1,343,115. Specification of Letters Patent. Patented June 8, 1920.

Application filed November 1, 1918. Serial No. 260,716.

*To all whom it may concern:*

Be it known that I, GEORGE E. CURRENT, a citizen of the United States, residing at Mogollon, in the county of Socorro and State of New Mexico, have invented new and useful Improvements in Rotary Engines, of which the following is a specification.

This invention relates to rotary engines, the object in view being to provide a simple, efficient and economically manufactured and maintained motor which may be operated by any fluid or liquid under pressure such as air, steam or water.

With the above and other objects in view, the invention consists in the construction, combination and arrangement of parts, as herein described, illustrated and claimed.

In the accompanying drawings:

Figure 1 is a vertical longitudinal section through the engine.

Fig. 3 is an enlarged fragmentary section showing the packing between the periphery of the rotor and the casing.

Figure 2:
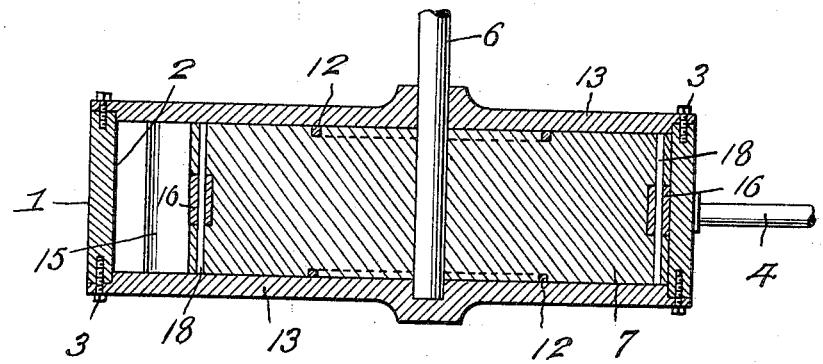
Fig. 2 is a cross section through the same on the line 2—2 of Fig. 1.

Referring to the drawings, 1 designates the casing of the engine, the same being formed with a cylindrical inner wall 2. The casing 1 is longitudinally divided or split into two sections which are bolted or otherwise secured together by fastening means 3. The casing 1 is provided with a fluid inlet port 4 and an outlet or exhaust port 5, said ports being arranged approximately ninety degrees apart as shown in Fig. 1.

6 designates the engine shaft upon which is mounted the rotor 7, the shaft 6 and rotor 7 are mounted eccentrically within the casing 1 as shown in Fig. 1, leaving a working chamber 8 which is of greatest width at its center and which tapers or reduces in width gradually therefrom toward the opposite ends and the opposite side of the casing. At the point where the rotor approaches or works in contact with the inner wall 2 of the casing 1, a packing strip 9 is arranged in a groove 10 in the inner wall of the casing and arranged in rear of said packing strip 9 is a spring 11 which serves to hold the packing strip in fluid tight engagement with the periphery of the rotor; thereby preventing leakage of the fluid.

Packing rings 12 are arranged between the opposite side faces of the rotor and the end walls or heads 13 of the casing 1. The rings 12 may be arranged either in grooves in the rotor or in grooves in the casing or in both, the object being to prevent leakage of the fluid toward the center of the rotor.

Figure 4:
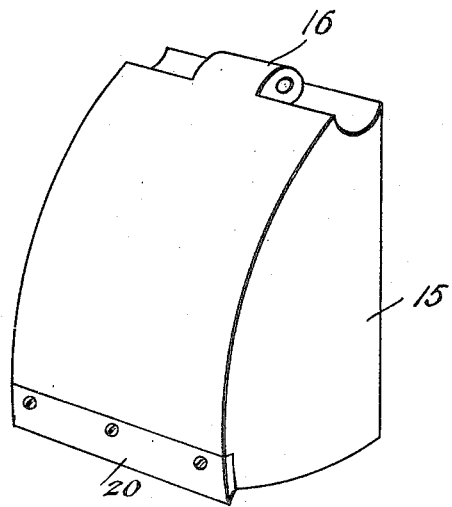
Fig. 4 is a detail perspective view of one of the pivotal wings or abutments carried by the rotor.

The rotor is formed in the periphery thereof with recesses or pockets 14, four of such pockets being shown although it will be obvious that the number of pockets may be increased or diminished, according to the size of the engine, the power required and other conditions. In each of the pockets 14 there is mounted a pivoted and oscillatory abutment or wing 15. One of said abutments is illustrated in detail in Fig. 4 where it is seen to comprise a pivot lug 16 which is received in a recess 17 in the rotor and secured by means of a pivot 18. The outer face of each abutment is described on the same arc as the periphery of the rotor as clearly shown in Fig. 1. The abutments 15 are of considerable weight and will swing outwardly from their respective pockets by gravity and centrifugal force after passing by the inlet 4 and will thereafter be held outwardly by the pressure of the fluid acting against the ends thereof. As the abutments move along the narrowing portion of the chamber 8, they are gradually swung inwardly until they lie flush within their respective pockets as they pass by the packing strip 9 and the inlet port 4. Any fluid or liquid under pressure may be used for operating the engine and the engine may, of course, be made of any size according to the horse power required.

In the preferred embodiment of the invention each of the abutments 15 is provided at the free end or edge thereof with a patching plate or strip 19, preferably of metal which works in contact with the inside wall of the casing. When said patching strip becomes worn it may be renewed at a small expense. If desired, and in order to insure the quick outward movement of the abutments, I may employ in connection with each abutment, a spring 20 arranged behind the abutments, as shown in Fig. 1.

I claim:—

A rotary engine comprising a casing having a cylindrical inner wall and provided with inlet and outlet openings for fluid under pressure, a shaft journaled through said casing eccentrically thereof, a circular rotor mounted upon said shaft and positioned to engage the inner wall of the casing in advance of the inlet opening therein, a spring-pressed packing strip mounted within the inner wall of the casing and engaging the rotor whereby to provide a leakproof joint, said rotor being provided at spaced intervals with substantially triangular pockets, and outwardly spring-pressed abutments pivoted within the pockets and having their outer surfaces of the same curvature as the outer surface of the rotor, the outer free edges of the abutments being each provided with a recess, and a bearing strip seated within each of said recesses and having a beveled free edge engaging against the inner wall of the casing, the rotor being notched at the edge of each pocket whereby to accommodate the bearing strips when the abutments are in fully retracted position.

In testimony whereof I affix my signature.

GEORGE E. CURRENT.